March 26, 1968  W. E. MARSHALL  3,375,098
GASEOUS REDUCTION OF IRON ORES
Filed July 22, 1964
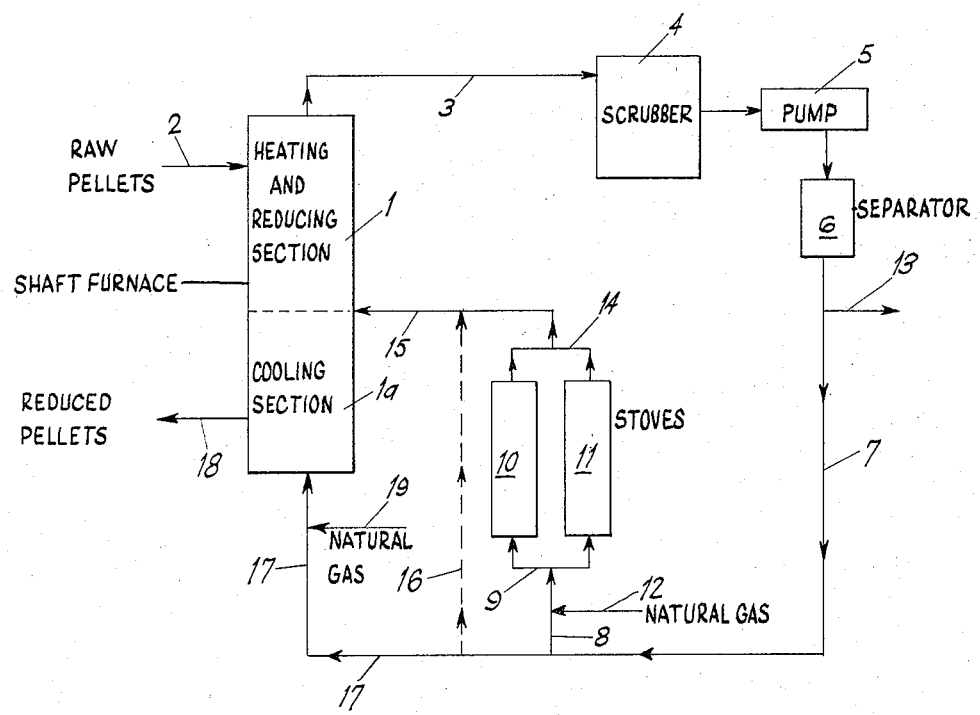
INVENTOR.
WILLIAM E. MARSHALL,
BY
ATTORNEYS.

3,375,098
GASEOUS REDUCTION OF IRON ORES
William E. Marshall, Middletown, Ohio, assignor to Armco Steel Corporation, Middletown, Ohio, a corporation of Ohio
Filed July 22, 1964, Ser. No. 384,373
3 Claims. (Cl. 75—35)

As is well known, the recovery of iron from iron ores is generally carried on in the blast furnace, which is a shaft furnace into which the iron ore, coke, and limestone are introduced at the top, and from which liquid iron and slag are tapped at the bottom at intervals of a few hours. A blast of preheated air is introduced through tuyeres located in the lower part of the furnace. The oxygen of the air unites with the coke to form carbon monoxide which in turn reduces the iron ore, with the freeing of the iron and the formation of carbon dioxide. The freed iron is melted by the heat of the reaction of coke burning with air at the tuyeres.

The successful operation of the blast furnace requires good quality coke of uniform lump size, and it either requires graded, good quality iron ore in lump form, or artificially formed agglomerates or substantially uniformly sized pellets of beneficiated iron ore.

High quality lump iron ores and blast furnace coke are becoming increasingly expensive, and in some areas are in short supply. It has hitherto been understood that if iron ores could be subjected to reduction in a suitable reactor by means of reducing gases elsewhere generated, the rigid requirement for high grade lump ore could be circumvented, and no blast furnace coke need be used at all. The gaseous media for the reduction of the iron ore could be generated by the partial combustion of any mobile fuel including natural or artificial combustible gases, hydrocarbon fuels of liquid character, and in some instances powdered coke or coal. In some areas, particularly near oil fields, there is an abundant and relatively cheap supply of natural gas, whereas such areas may be remote from any source of high grade lump ore or coal suitable for the preparation of high grade coke. It has been suggested that the ore itself might be in finely divided form, and that the direct gaseous reduction be carried on in a reactor in which the finely divided ore was maintained by the gases in a "fluidized" condition. A certain amount of success has attended the following of these suggestions; but attempts to carry on gaseous reduction and melting of the free iron have presented numerous difficulties, while attempts to reduce finely divided iron ores in a fluo-solids reactor often are unsatisfactory because some ores are difficult to fluidize.

The artificial pellets of beneficiated iron ores to which reference has been made above are generally formed from taconites, a relatively inferior although abundant iron ore material. The taconites, which are high in silica or other gangue materials, contain magnetic iron oxide. Thus it is possible to crush the taconites to a very finely divided condition, and beneficiate the ore by magnetic separation. The beneficiated or rich material can then be formed into pellets or pieces of a sufficient size for use in a blast furnace in various ways (see Proceedings of the Blast Furnace and Raw Materials Committee of the A.I.M.M.E., vol. 4, 1944, pp. 46 to 65). The beneficiated ore is regularly formed into spherical pellets having a diameter of about ⅜″ and having sufficient durability for handling, shipment, storage and use in a blast furnace. Pellets are currently made containing as much as 67% iron and as little as 1.5% silica or other gangue material. It is generally possible to make these pellets at a cost, on the basis of their iron content, comparable to the cost of blast furnace ore. The use of these pellets in the blast furnace has been very successful.

The present invention has to do with the direct gaseous reduction of pellets of this general nature. In the process herein described blast furnace coke is not required, and the ore cost per unit of recovered iron should not be substantially greater than the cost of blast furnace ore. The process herein described is not a smelting process, because the reduced iron is not melted in the process itself; but it has been found that pellets of the type referred to can be subjected to direct gaseous reduction without disintegration. The degree of reduction achieved in the process can be at least about 97 to 98%, but the process may be practiced as to produce lesser degrees of reduction. The reduced pellets are delivered at a temperature below the oxidation temperature in air, and the reduced pellets are well suited for use as melting stock, as for example in the electric furnace. The skilled worker will understand that in many areas where pig metal is unavailable, iron and steel products are made by melting scrap in the electric furnace. Such remelted scrap is generally contaminated with tramp metals, and the product of this invention is useful for diluting the tramp metals in such scrap melts, as well as for the purpose of replacing scrap where economics permit.

The actual reduction of the pellets takes place in a vertically elongated shaft furnace. This presents no difficulty since the pellets are of uniform size; and, since they do not disintegrate upon reduction, they feed well in the furnace, are not subject to "hanging up" on the furnace walls, and permit an even contact of the reducing gases will all parts of the charge. The shaft furnace has a temperature gradient from a central hot zone toward both the top and the bottom of the shaft. The reduction is accomplished primarily in the hot zone where the temperature is substantially within the range of 1300° F. to 1800° F. With a residence time of approximately three hours (which is rather widely variable depending upon various conditions including the reducing power of the gas, the gas flow rate, and the like) a high degree of reduction can be achieved in the pellets. The process herein described has the advantage of being continuous in character, i.e. the pellets are fed in at the top of the shaft, and the furnace is capable of delivering reduced pellets continuously at a rate dependent upon the size of the furnace and the desired residence time therein.

It is a basic object of this invention to attain greater fuel efficiency and lower costs of operation in a process of the type which is later outlined.

It is an object of the invention to provide a self-contained process in the sense that the economics thereof are not dependent upon the use elsewhere and for other purposes of great quantities of gases generated in the process and containing combustible values.

It is an object of the invention to provide a process and apparatus which is simpler and more economical than those hitherto known in the art.

The reduction of iron ore by gases consisting essentially of carbon monoxide and hydrogen results in a conversion of carbon monoxide to carbon dioxide and a conversion of hydrogen to water vapor, accompanied by a lowering of the reducing potential of the gaseous mixture. In most of the hitherto suggested processes recirculation of the gases has been a feature. By cooling the recirculated gases the moisture can largely be removed from them. But the loss of carbon monoxide and hydrogen has to be made up in some way. The generation of reducing gases by the partial combustion of a mobile fuel is usually proposed. But it is generally necessary to use oxygen rather than air for the combustion. This is thermodynamically more efficient since the presence and heating and cooling of inert gases such as nitrogen are avoided. At the same time the procedure requires an oxygen plant, which is a matter of substantial cost.

In these prior art processes, the cooled recirculated gases, which have had their reducing potential somewhat restored, can be mixed with the products of combustion. It will, of course, be necessary to bleed out of the system a quantity of gas equivalent to the added products of combustion minus any leakages in the system.

It is an object of this invention to provide a method for the gaseous reduction of iron ores which does not require the partial combustion of a mobile fuel or the provision of an oxygen plant.

It has hitherto been suggested that reformation of the carbon dioxide content of the used gases be attempted. This has been thought to require the use of a catalyst, and in the present state of the art catalysts satisfactory for the purpose have not been developed. The present invention also avoids the use of steam as a reforming agent, thereby eliminating the considerable expense of removing water from the reformed gases and reheating them before they can be used for reducing purposes.

It is an object of this invention to provide a process involving the non-catalytic reformation of carbon dioxide.

These and other objects of the invention which will be set forth hereinafter or will be apparent to one skilled in the art upon reading these specifications, are accomplished by that certain construction and arrangement of parts and in that procedure of which certain exemplary embodiments will now be described. Reference is made to the accompanying drawing which is a diagrammatic representation of the system of this invention.

Briefly, the practice of this invention is dependent upon the non-catalytic reaction of carbon dioxide and methane (e.g. natural gas) in accordance with the following:

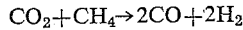

$$CO_2 + CH_4 \rightarrow 2CO + 2H_2$$

Not only does this reaction proceed under conditions of heat without the use of a catalyst, but it will also be noted that the volume of the reacting gases doubles as a result of the reaction; and this is important in the process itself because the extra volume supplies gases which would otherwise be needed to make up for gases lost in the process.

Referring now to the drawing, 1 represents a shaft furnace of suitable design and length for the gaseous reduction of ore pellets. The pellets are introduced into the furnace at the top thereof as indicated by the numeral 2. Usually this is done in increments through a double bell mechanism (not shown). The ore pellets are reduced in the furnace by reducing gases consisting essentially of carbon monoxide and hydrogen, and at an elevated temperature between about 1300° F. and about 1800° F., and preferably between about 1500° and about 1800° F. The top gases from the furnace are drawn off through a conduit 3 and are passed through a gas washer 4, wherein they are cooled, a pump 5 which enforces the recirculation, and a water separator 6.

The withdrawn gases contain carbon dioxide, but their reducing capacity has been substantially improved by the elimination of most of the moisture. The gases next pass through conduit means 7 and 8 to branch connection means 9 containing valves (not shown) whereby they can be passed through stoves 10 and 11 selectively. While two stoves have been shown, more may be provided if desired. Before entering a stove the recirculated gases will be enriched with natural gas shown entering the system at 12, and preferably added in stoichiometric proportion to the carbon dioxide content for the reaction outlined above.

The stoves 10 and 11 will be understood by the skilled worker in the art to be similar in construction to the stoves of a blast furnace in that they will be refractory-lined vessels filled with brick checker work or with refractory balls or other shapes assuring free passage for the gases. Since the recirculated gases have been cooled, the function of the stoves will be to reheat the reconstituted gases to the proper temperature range for reduction as well as to cause the reaction between carbon monoxide and methane to take place. The stoves will be provided each with a burner or burners and with a stack to carry off the products of combustion. These elements have not been illustrated since they will be well understood by the skilled worker in the art. They will be provided with valve means either manual or automatic; and it will be understood that a stove or group of stoves will be heated interiorly by combustion, after which the burners will be shut off, the stack closed, and the process gases sent through to be heated and reacted as aforesaid.

The stove temperature range is preferably from about 2000° F. to about 3000° F., the upper limit being dictated by the materials of construction.

It will be necessary to bleed some gas out of the system to compensate for the extra volumes of reformed gases produced by the natural gas infeed 12 and produced by the reaction in the operating stove or stoves. The stove or stoves which are being heated at the time may employ the bleedout gas as fuel together with such additional quantities of natural gas or other mobile fuel as are required. Air may be used for the combustion; and the combustion may be complete since the products of the combustion are merely vented to the atmosphere and do not enter the recirculatory system.

The heated process gases are collected as at 14 and returned by a conduit 15 to the furnace for the reduction of additional ore pellets.

It is possible to provide a bypass 16 for the cooled top gases to the conduit 15. Thus the relatively cool top gases can be employed through the operation of valving means to prevent the attainment of too high a temperature in the process gases.

It will be noted from the figure that the shaft furnace is shown as comprising two parts, an upper section 1 in which the ore pellets are reduced, and a lower section 1a which is a cooling section. The hot process gases are introduced into the furnace at the bottom portion of the reducing section; but it is well to introduce another portion of the cooled top gases through a conduit 17 into the lower portion of the cooling section 1a.

The purpose of this is to cool the reduced ore pellets in a protective atmosphere preferably until they reach a temperature low enough to prevent air oxidation upon removal of the reduced pellets as indicated at 18.

It is further possible to enrich the cooled top gases entering the lowermost section of the furnace by adding natural gas or other product rich in methane as at 19. It has been found that as the enriched top gases are heated up by the descending pellets, the pellets themselves act as a catalyst, permitting reforming reaction like that set forth above to occur at a lower temperature in the cooling section of the furnace. Thus reforming occurs to a helpful extent, although not to as great an extent as in the high temperature stoves.

For details of an exemplary shaft furnace and cooling section together with appurtenant apparatus reference is made to the copending application in the name of the same inventor and entitled The Production of Iron from Pelletized Iron Ores, Ser. No. 379,282, filed June 30, 1964.

Modifications may be made in the invention without departing from the spirit of it.

The embodiments of the invention in which an exclusive property or privilege is claimed are defined as follows:

1. A process for the gaseous reduction of iron ores to iron by means of a gaseous mixture consisting essentially of carbon monoxide and hydrogen in a reduction zone at high temperature, whereby carbon dioxide and water vapor are produced in said gaseous mixture, comprising the steps of regenerating the said gaseous mixture by withdrawing the top gases from the said reaction zone, cooling the top gases whereby to abstract water from them while allowing carbon dioxide to remain therein, enriching the said top gases solely with a methane-bearing gas, passing the enriched gases through a heating zone at about 2000° to 3000° F. in which a reaction between carbon dioxide and methane is caused to take place with the production of carbon monoxide and hydrogen, moderating the temperature of the gases to a temperature substantially between about 1300° F. and about 1800° F., and returning the regenerated gases to the reduction zone.

2. The process claimed in claim 1 including the step of controlling the temperature of the regenerated gases prior to their reentry into the reduction zone by mixing therewith a portion of the cooled top gases.

3. The process claimed in claim 1, wherein the reduced ore is passed from the reduction zone into an adjacent cooling zone and wherein a portion of the said cooled top gases is first enriched with a portion of a methane-bearing gas and is then introduced into the said cooling zone, whereby to cool the reduced ore and to cause a reformation reaction to take place in said cooling zone.

References Cited

UNITED STATES PATENTS

| | | | |
|---|---|---|---|
| 1,919,857 | 7/1933 | Pier et al. | 48—213 X |
| 2,266,989 | 12/1941 | Radtke | 48—213 X |
| 3,288,590 | 11/1966 | Keith et al. | 75—35 X |
| 2,740,706 | 4/1956 | Paull et al. | 75—35 |
| 3,148,050 | 9/1964 | Von Bogdandy | 75—91 X |
| 3,189,438 | 6/1965 | Von Bogdandy | 75—35 X |

FOREIGN PATENTS 466,592  1935  Great Britain.

H. W. TARRING, *Assistant Examiner.*

DAVID L. RECK, *Primary Examiner.*